(12) United States Patent
Lord et al.

(10) Patent No.: US 8,408,301 B2
(45) Date of Patent: Apr. 2, 2013

(54) SHEAR TOLERANT AQUEOUS BASED FRACTURING FLUIDS AND METHODS

(75) Inventors: Paul D. Lord, Duncan, OK (US); Ivan Suleiman, Duncan, OK (US); John M. Terracina, Duncan, OK (US); Rajendra A. Kalgaonkar, Pune (IN)

(73) Assignee: Halliburton Energy Services, Inc., Duncan, OK (US)

( * ) Notice: Subject to any disclaimer, the term of this patent is extended or adjusted under 35 U.S.C. 154(b) by 160 days.

(21) Appl. No.: 12/783,715

(22) Filed: May 20, 2010

(65) Prior Publication Data

US 2011/0284225 A1   Nov. 24, 2011

(51) Int. Cl.
 *E21B 43/22* (2006.01)
 *E21B 43/26* (2006.01)
 *C09K 8/62* (2006.01)
 *C09K 8/90* (2006.01)

(52) U.S. Cl. ..... 166/279; 166/283; 166/300; 166/308.5; 507/215; 507/271; 507/273

(58) Field of Classification Search ......... None
See application file for complete search history.

(56) References Cited

U.S. PATENT DOCUMENTS

| | | | |
|---|---|---|---|
| 5,669,446 A | 9/1997 | Walker et al. | |
| 5,669,447 A | 9/1997 | Walker et al. | |
| 5,950,731 A | 9/1999 | Shuchart et al. | |
| 6,024,170 A | 2/2000 | McCabe et al. | |
| 6,640,898 B2 | 11/2003 | Lord et al. | |
| 6,737,386 B1 | 5/2004 | Moorhouse et al. | |
| 6,911,419 B2 | 6/2005 | Lord et al. | |
| 6,923,264 B2 | 8/2005 | Slabaugh et al. | |
| 7,165,617 B2 | 1/2007 | Lord et al. | |
| 7,261,158 B2 | 8/2007 | Middaugh et al. | |
| 7,290,614 B2 | 11/2007 | Smith et al. | |
| 7,299,876 B2 | 11/2007 | Lord et al. | |
| 7,334,640 B2 | 2/2008 | Hanes, Jr. et al. | |
| 2002/0010101 A1 | 1/2002 | Pakulski et al. | |
| 2005/0077044 A1* | 4/2005 | Qu et al. ............ | 166/279 |
| 2006/0090895 A1* | 5/2006 | Chatterji et al. ........ | 166/278 |
| 2006/0229213 A1* | 10/2006 | Harris et al. .............. | 507/271 |
| 2008/0289827 A1 | 11/2008 | Welton et al. | |
| 2008/0300152 A1* | 12/2008 | Hanes, Jr. .............. | 507/239 |
| 2012/0000659 A1* | 1/2012 | Loveless et al. .......... | 166/305.1 |

FOREIGN PATENT DOCUMENTS

| | | |
|---|---|---|
| GB | 2 254 636 A | 10/1992 |
| GB | 2 449 337 A | 11/2008 |
| WO | WO 2010/093473 A1 | 8/2010 |

OTHER PUBLICATIONS

International Search Report and Written Opinion for PCT/GB2011/000757 dated Aug. 19, 2011.
Hallilburton Brochure "Seawater-based Fluid System for Fracturing and FracPacSM Service (SeaQuest® HT Service) Helps Achieve Enhanced Well Performance and More Flexible Service Delivery", Jun. 2009.

* cited by examiner

*Primary Examiner* — Zakiya W Bates
(74) *Attorney, Agent, or Firm* — Robert A. Kent; McDermott Will & Emery LLP

(57) ABSTRACT

A method comprises providing a treatment fluid comprising a gelling agent, an aqueous base fluid, a buffer composition comprising a plurality of salts, and a crosslinking agent; and contacting a subterranean formation with the treatment fluid. The aqueous base fluid is preferably seawater and the buffer composition includes one or more salts present in the treatment fluid from about 1 to about 1000 pounds per gallon of treatment fluid.

18 Claims, 3 Drawing Sheets

SHEAR TOLERANT AQUEOUS BASED FRACTURING FLUIDS AND METHODS

BACKGROUND

The present invention relates to aqueous-based treatment fluids. More specifically, the present invention relates to aqueous-based treatment fluids comprising a buffer composition and methods of using the treatment fluids in subterranean formations penetrated by well bores.

Oil and gas wells often undergo hydraulic fracturing operations to increase the flow of oil and natural gas from subterranean formations. Hydraulic fracturing is accomplished by injecting a viscous fracturing fluid through the well bore into a subterranean formation to be fractured and applying sufficient fluid pressure on the formation to cause the production of one or more fractures therein. In offshore operations, the fracturing fluid can be prepared utilizing seawater to hydrate a gelling agent to form a viscous aqueous fluid. To promote adequate viscosity at increased well depths, crosslinking agents such as borate ion releasing compounds can be incorporated into the fracturing fluids.

Seawater-based borate crosslinked fracturing fluids perform satisfactorily in low temperature fracturing applications, typically about 200° F. or less. At these lower temperatures, the initial pH required to form a sufficiently crosslinked gel is about 9.5 or less. In general, a sufficiently crosslinked gel is defined as having a viscosity of about 200 centipoises or greater at 40 sec$^{-1}$ shear rate. In order to form a sufficiently crosslinked gel for use at formation temperatures in excess of 200° F., a borate crosslinked fracturing fluid will require a pH of about 9.5 or greater. Elevation of the fracturing fluid pH to a level in excess of 9.5, however, poses several operational problems. For instance, seawater contains multivalent ions such as calcium and magnesium ions which form insoluble precipitates at a pH greater than about 9.5. The presence of the solid precipitates can reduce the proppant pack conductivity, and ultimately the productivity of the fracturing operation.

Furthermore, elevating the pH of the fracturing fluid to a pH greater than about 9.5 is difficult due to the formation of magnesium hydroxide. Hydroxyl ions needed to elevate the pH of the seawater are consumed in the formation of magnesium hydroxide. This reaction proceeds very slowly causing the pH change to be time-delayed and difficult to adjust. In addressing the problems associated with precipitate formation in high-temperature seawater-based fracturing fluids, prior art methods suggest the removal of solid precipitates by filtration. However, the proper disposal of magnesium hydroxide and other precipitates creates additional operational costs as well as environmental challenges.

In order to conduct fracturing operations at greater well depths, it is desirable to delay crosslinking of the fracturing fluid. In particular, a delayed crosslink is advantageous in the fracturing of offshore formations where such operations are usually performed at lower injection rates because of pumping equipment limitations. Reduced injection rates, typically about 10 barrels/minute or less, lead to increased pipe times. Pipe time refers to the time required for the fracturing fluid to make the transit from surface pumping equipment to the formation to be fractured. It is generally desirable to have crosslinking occur near the end of the pipe time as the fluid approaches the formation to be fractured. If crosslinking occurs too early, the increase in fracturing fluid viscosity increases friction loss in the well bore and produces high pump pressures. To overcome these problems, the crosslinking of the fracturing fluid can be delayed until the fluid approaches a location near or within the formation to be fractured. Another side affect of early crosslinking may be the shear thinning of the fluid as it passes through the pipe. The shear thinning may be irreversible for some fluids.

For these reasons, there is a need for an aqueous-based fracturing fluid that avoids precipitate formation, forms delayed crosslinks in high temperature fracturing operations, and has a good shear recovery for regaining viscosity upon exiting a high shear region.

SUMMARY

The present invention relates to aqueous-based treatment fluids. More specifically, the present invention relates to aqueous-based treatment fluids comprising a buffer composition and methods of using the treatment fluids in subterranean formations penetrated by well bores.

An embodiment of the present invention comprises a method comprising: providing a treatment fluid comprising a gelling agent, an aqueous base fluid, a buffer composition comprising a plurality of salts, and a crosslinking agent; and contacting a subterranean formation with the treatment fluid.

Another embodiment of the present invention comprises a method comprising: providing a treatment fluid comprising a gelling agent, an aqueous base fluid, a buffer composition, and a crosslinking agent, wherein the treatment fluid has a high shear recovery greater than 100%; introducing the treatment fluid into a subterranean formation at a rate and pressure whereby a fracture is formed in the subterranean formation; allowing the treatment fluid to break; and recovering at least a portion of the treatment fluid.

Still another embodiment of the present invention comprises a composition comprising: a gelling agent; an aqueous base fluid; a buffer composition comprising a plurality of salts; and a crosslinking agent.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF THE PREFERRED EMBODIMENTS

Figure 1:
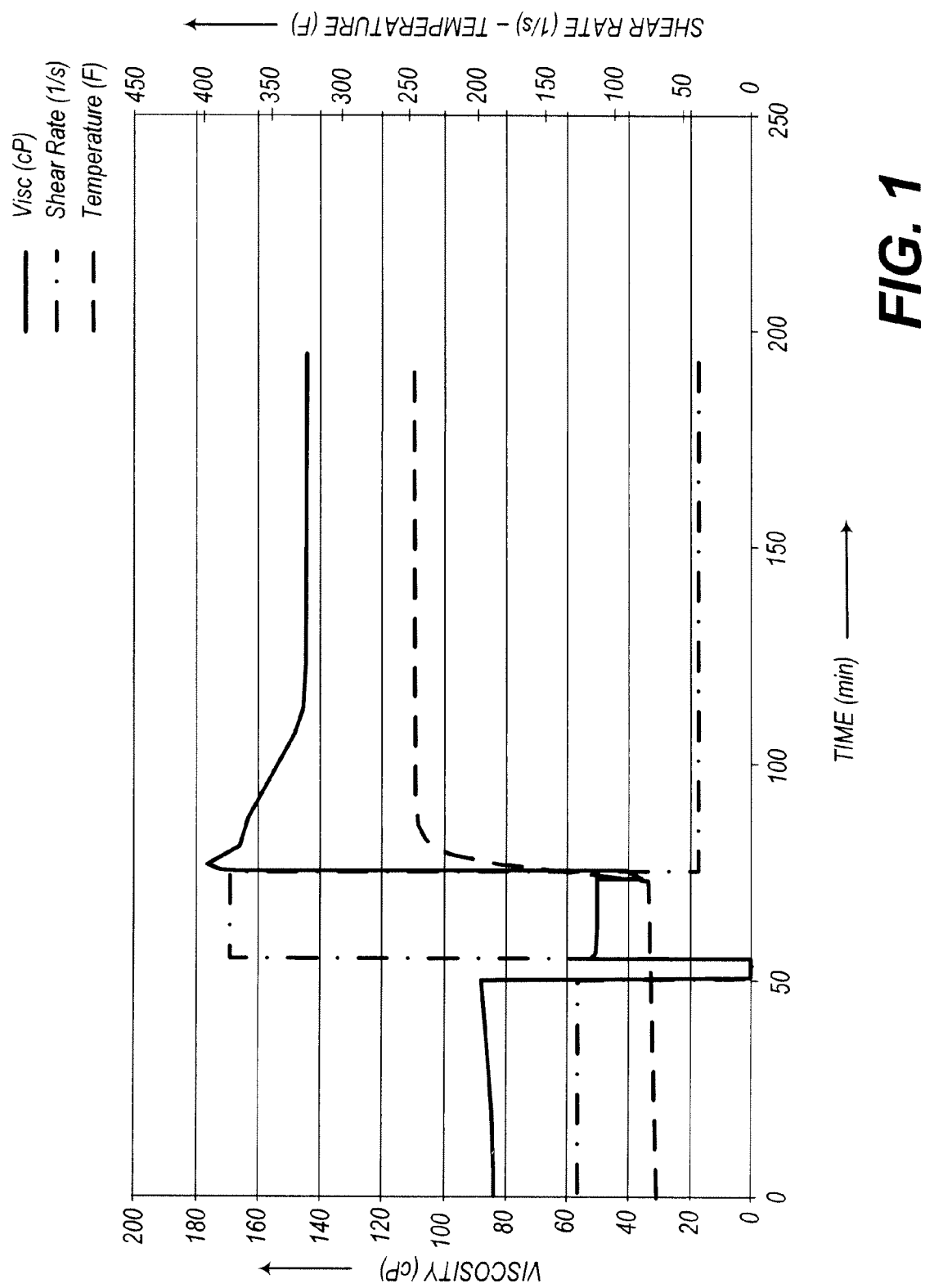
FIG. 1 illustrates a viscosity profile of a fluid subjected to varying degrees of shear rate.

The present invention relates to aqueous-based treatment fluids. More specifically, the present invention relates to aqueous-based treatment fluids comprising a buffer composition and methods of using the treatment fluids in subterranean formations penetrated by well bores.

A primary advantage of the treatment fluids of the present invention is that the fluids can be prepared with any aqueous fluid, including seawater pumped from the ocean at the site of the treatment operation, wherever the job happens to be. As used herein, the term "treatment fluid" refers generally to any fluid that may be used in a subterranean application in conjunction with a desired function and/or for a desired purpose. The term "treatment fluid" does not imply any particular action by the fluid or any component thereof. As a result, the present compositions can be inexpensive and simple to prepare, using either batch mixing or on-the-fly procedures.

Another primary advantage is that the treatment fluids of the present invention are stable at temperatures above about 200° F. and at a pH of about 9.5 to about 10 or less. The presence of a buffer solution provides for good shear recovery. Due to the lower pH, the fluids are compatible with enzyme breakers, and calcium and magnesium salts remain in solution. Even where the gelling agent has been hydrated with seawater, the fracturing fluid provides a delay in crosslinking, conducive to fracturing subterranean formations at greater depths and/or with lower injection rates. Thus, the fracturing fluid has an initial viscosity that is high enough to transport proppant but is not so high as to make pumping difficult.

In general, the treatment fluids of the present invention comprise an aqueous base fluid, a gelling agent, a buffer composition, and a crosslinking agent capable of causing crosslinking of the gelling agent that is compatible with the buffer composition. In an embodiment, the treatment fluid is used as a fracturing fluid.

The aqueous base fluid used in the treatment fluids of the present invention comprises one or more aqueous fluids. For example, the aqueous base fluid may include, but is not limited to, seawater, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the treatment fluids of the present invention. In certain embodiments, the density of the aqueous base fluid can be increased, among other purposes, to provide additional particle transport and suspension in the treatment fluids of the present invention.

In certain embodiments, the pH of the aqueous base fluid may be adjusted (e.g., by a buffer or other pH adjusting agent), inter alia, to facilitate hydration of the gelling agent, to activate a crosslinking agent, and/or to reduce the viscosity of the treatment fluid (e.g., activate a breaker, deactivate a crosslinking agent). In these embodiments, the pH may be adjusted to a specific level, which may depend on, among other factors, the types of gelling agents, and/or crosslinking agents in the treatment fluid. In general, the pH of the fluid may be about 10 or less when a stable gelled fluid is desired. Suitable pH adjusting agents include any compounds capable of altering the pH of the treatment fluid. Examples of such compounds that may be used include, but are not limited to, formic acid, fumaric acid, acetic acid, acetic anhydride, hydrochloric acid, sodium hydroxide, potassium hydroxide, lithium hydroxide, various carbonates, any combination thereof, or any other commonly used pH control agent that does not adversely react with the gelling agent, crosslinker, or buffering agent to prevent its use in accordance with the method of the present invention. Of these, sodium hydroxide is preferred. When used, the pH-adjusting compound is generally present in a treatment concentrate of the present invention in an amount in the range of from about 0.5% to about 10% by weight of the aqueous fluid therein. In another embodiment, the pH-adjusting compound is generally present in a treatment fluid of the present invention in an amount in the range of from about 0.01% to about 0.3% by weight of the aqueous fluid therein. In an embodiment, the pH adjusting agent comprises sodium hydroxide and is present in an amount from about 0.01 gallons per thousand gallons of treatment fluid ("gpt") to about 2 gpt. One of ordinary skill in the art, with the benefit of this disclosure, will recognize when such density and/or pH adjustments are appropriate.

In an embodiment, a gelling agent is present to provide a viscosifying agent for the treatment fluid. The gelling agent may be any suitable gelling agent that is capable of being crosslinked by a crosslinking agent and is compatible with the aqueous base fluid and the buffer composition. Suitable gelling agents may comprise guar, hydroxypropylguar, carboxymethylhydroxypropylguar, carboxymethylguar, carboxymethylcellulose, carboxymethylhydroxyethylcellulose, and any combination thereof. Additional examples of gelling agents which may be utilized in the present invention include but are not limited to galactomannan gums, modified or derivative galactomannan gums, and cellulose derivatives. Other natural or synthetic polymers which are known in the art but which are not specifically mentioned herein can also be utilized.

The gelling agent may be present in the treatment fluid in an amount in the range of from about 10 to about 100 pounds per 1000 gallons of the aqueous base fluid, preferably from about 30 to about 50 pounds per 1000 gallons of aqueous base fluid. The aqueous base fluid is generally present in the treatment fluid in at least an amount sufficient to hydrate the gelling agent.

The treatment fluids of the present invention comprise a suitable crosslinking agent, inter alia, to crosslink the gelling agent. Crosslinking agents are generally included in the treatment fluids of the present invention to crosslink at least a portion of the molecules of the gelling agent to form a crosslinked gelling agent. The term "crosslinking agent" is defined herein to include any molecule, atom, or ion that is capable of forming one or more crosslinks between molecules of the crosslinkable gelling agent and/or between one or more atoms in a single molecule of the crosslinkable gelling agent. The crosslinking agent in the treatment fluids of the present invention may comprise a metal ion that is capable of crosslinking at least two molecules of the crosslinkable gelling agent. Examples of suitable crosslinking agents include, but are not limited to, borate ions and zirconium ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium oxychloride, chelates of zirconium, derivatives thereof, and combinations thereof. In certain embodiments of the present invention, the crosslinking agent may be present in a gelling agent, wherein at least a portion of the molecules of the gelling agent are crosslinked by the crosslinking agent.

Suitable crosslinking agents may be present in the treatment fluids of the present invention in an amount sufficient to provide, inter alia, the desired degree of crosslinking between molecules of the gelling agent. In certain embodiments, the crosslinking agent may be present in the treatment fluids of the present invention in an amount in the range of from about 1 part per million ("ppm") to about 1,000 ppm by weight of the treatment fluid. In certain exemplary embodiments, the crosslinking agent may be present in the treatment fluids of the present invention in an amount in the range of from about 10 ppm to about 500 ppm by weight of the treatment fluid. One of ordinary skill in the art, with the benefit of this disclosure, will recognize the appropriate type and amount of crosslinking agent to include in a treatment fluid of the present invention based on, inter cilia, the temperature conditions of a particular application, the type of gelling agent used, the molecular weight of the gelling agent, the degree of rheological modification desired, and/or the pH of the treatment fluid. In an embodiment, the crosslinking agent may be capable of crosslinking the gelling agent at a pH of about 10 or less. In an embodiment, the crosslinking agent may be capable of crosslinking the gelling agent at a temperature ranging from about 200° F. to about 325° F., or alternatively at a temperature ranging from about 215° F. to about 300° F.

The crosslinking agents may be provided or used in any suitable form. For instance, the crosslinking agents may be a liquid, a gel, an emulsion, or a solid. In some embodiments, a crosslinking agent may be dissolved, suspended, or emulsified in a liquid. The crosslinking agent utilized in the present invention may be capable of causing delayed crosslinking of the gelling agent for pipe transit times greater than 5 minutes. Thus, the delay in crosslinking exhibited by compositions of the present invention may be about 5 minutes or more. A delayed release may be desirable when a subterranean operation involves high temperature conditions, and in a deep well or in a well requiring a long pump time. In some embodiments, the crosslinking agent may be capable of causing an accelerated crosslinking of the gelling agent. Such acceleration may be desirable due to the conditions of the treatment fluid and the expected conditions within the subterranean formation. For example, the temperature of the formation may make it desirable to include an accelerated crosslinking agent in the treatment fluid. Suitable accelerated crosslinking agents may include, but are not limited to, instant borate, instant zirconium, or any combination thereof. The composition of the crosslinking agent and/or the buffering composition can affect the rate of crosslinking of the gelling agent.

In certain embodiments, the crosslinking agents of the present invention may be encapsulated or enclosed within an outer coating that is capable of degrading at a desired time. In an embodiment in which the crosslinking agent is encapsulated, the crosslinking agent may comprise a coating or containment means. In general, suitable coating or containment means are degradable materials in which the products of the degradation do not adversely affect the crosslinking agent of the present invention. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that may be used as a coating or containment means in conjunction with the crosslinking agents of the present invention include, but are not limited to, polysaccharides, such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; ortho esters; poly(orthoesters); poly(amino acids); poly(ethylene oxides); and poly(phosphazenes). Other suitable degradable polymers include heat-sealable materials, other thermoplastic materials, or materials that may be dissolved with an appropriate solvent (e.g., hydroxypropylmethylcellulose, pectin, polyethylene oxide, polyvinyl alcohol, alginate, polycaprolactone, gelatinized starch-based materials, and the like). In certain exemplary embodiments, blends of these materials may be used. A person having ordinary skill in the art, with the benefit of this disclosure, will recognize the appropriate encapsulation or coating technique to use with the crosslinking agents of the present invention.

The treatment fluids of the present invention comprise a buffer composition, which may improve the shear recovery of the treatment fluid. In general, it may be important for a fluid to regain viscosity after exiting a high-shear region in a wellbore tubular and entering a low-shear environment in a subterranean environment. The shear recovery of a fluid may be measured by the viscosity of the fluid at a low shear rate after experiencing a high shear event. For example, a high shear event may be an event with a shear rate of at least 375 sec for at least 2 minutes followed by a reduced shear rate. Such a high shear event may be referred to as a super shear event, and in some embodiments may have a shear rate ranging from about 375 $s^{-1}$ to about 800 or alternatively, 450 $s^{-1}$ to about 500 $s^{-1}$. For fracturing operations, a low shear rate of 40 $sec^{-1}$ is generally used as a standard for measuring low shear viscosity of a fracturing fluid. In an embodiment, the shear recovery may be measured in accordance with the American Petroluem Institute's testing procedure—API RP 39, "Measuring the Viscous Properties of a Crosslinked Water-Based Fracturing Fluid," (3d ed. 1998). As used herein, the term "high shear recovery" when used in combination with a fluid comprising a buffer composition refers to a fluid viscosity that is greater than the viscosity of a fluid without a buffer composition after a high shear event. In an embodiment, the viscosity of a fluid with a buffer composition may be at least 100% greater than the viscosity of a fluid without the buffer composition after a high shear event. In another embodiment, the viscosity of a fluid with a buffer composition may be at least 200%, or alternatively 300% greater than the viscosity of a fluid without the buffer composition after a high shear event.

A buffer composition generally is an aqueous solution consisting of a mixture of a weak acid and its conjugate base. It has the property that the pH of the solution changes very little when a small amount of acid or base is added to it. The buffer composition may include one or more salts capable of existing in a solution with a pH of about 10 or less. Examples of buffer compositions that may be used include, but are not limited to, sodium carbonate, potassium carbonate, sodium bicarbonate, potassium bicarbonate, derivatives thereof, and any combinations thereof.

When used, the buffer composition is generally present in the treatment fluids in an amount in the range of from about 1 pound per 1000 gallons of the treatment fluid to about 50 pounds per 1000 gallons of the treatment fluid. The amount of the buffer composition used may depend on a variety of factors including the aqueous base fluid ion composition, if any, the temperature, and the other components in solution. In an embodiment, a combination of buffer compositions may be used to achieve the desired shear recovery of the treatment fluid. For example, a combination of potassium carbonate and sodium bicarbonate may be used with an aqueous based treatment fluid. In this embodiment, the total amount of buffer composition in the treatment fluid may fall within the range listed above, and the amount of each component of the combination may be evenly distributed or there may be more or less of one component relative to the other. For example, in an embodiment using potassium carbonate and sodium bicarbonate, the treatment fluid may comprise from about 0.2 to about 10 pounds of potassium carbonate per 1000 gallons of treatment fluid and from about 0.8 to about 40 pounds per 1000 gallons of sodium bicarbonate. In another embodiment using potassium carbonate and sodium bicarbonate, the treatment fluid may comprise from about 1 to about 5 pounds of potassium carbonate per 1000 gallons of treatment fluid and from about 5 to about 20 pounds per 1000 gallons of sodium bicarbonate.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

The treatment fluid of the present invention can also comprise a gel breaker which "breaks" or diminishes the viscosity of the fracturing fluid so that it is more easily recovered from the fracture during clean up. Examples of gel breakers suitable for use with the inventive fracturing fluids include oxidizing agents, enzymes, acids, and any combination thereof, with oxidizing agents being the most preferred. In an embodiment, the gel breaker may comprise a delayed gel breaker. Examples of delayed gel breakers that may be used include, but are not limited to, various lactones, esters, encapsulated acids and slowly soluble acid generating compounds, oxidizers which produce acids upon reaction with water (such as polyesters or polyorthoesters), water reactive metals such as aluminum, lithium and magnesium and the like. In certain embodiments, the delayed gel breaker is an ester. Where used, the gel breaker is generally present in the treating fluid in an amount in the range of from about 0.01% to about 1% by weight of the aqueous fluid therein. Alternatively, any of the conventionally used delayed breakers employed with metal ion crosslinkers may be used, for example, oxidizers such as sodium chlorite, sodium hypochlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, maltase, cellulase and hemicellulase. The specific breaker or delinker used, whether or not it is encapsulated, as well as the amount thereof employed will depend upon the breaking time desired, the nature of the polymer and crosslinking agent, formation characteristics and conditions and other factors.

The treatment fluids of the present invention optionally may include one or more of a variety of well-known additives which do not adversely react with the treatment fluids. Exemplary additives may include, but are not limited to, gel stabilizers, fluid loss control additives, acids, corrosion inhibitors, catalysts, clay stabilizers, biocides, bactericides, friction reducers, gas, surfactants, solubilizers, pH adjusting agents, and the like. For example, in some embodiments, it may be desired to foam a treatment fluid of the present invention using a gas, such as air, nitrogen, or carbon dioxide. Those of ordinary skill in the art, with the benefit of this disclosure, will be able to determine the appropriate additives for a particular application.

The treatment fluids of the present invention can be prepared by dissolving a gelling agent in an aqueous base fluid to form a gelled aqueous fluid along with a buffer composition, and then combining with the gelled aqueous base fluid a crosslinking agent, capable of causing crosslinking of the gelling agent. The gelling agent is added to the aqueous base fluid as either a solid or a liquid gel concentrate in a prehydrated or slurried form using conventional mixing and pumping equipment. The delayed crosslinking composition may be combined with the gelled aqueous base fluid. The buffer composition may generally be combined with the aqueous base fluid prior to the addition of the gelling agent and crosslinking agent, though it can be added in a different order if required. For example, the buffer composition may be a part of the liquid gel concentrate used to add the gelling agent. As is understood by those skilled in the art, the crosslinker may be pumped and metered into the gelled aqueous fluid as the gelled aqueous fluid is pumped into the well bore. Additional components may be added into the treatment fluid with the gelling agent or on the fly as the gelled aqueous base fluid is pumped into the well bore.

In an embodiment, a method of using the treatment fluid comprises providing a treatment fluid comprising a gelling agent, an aqueous base fluid, a buffer composition, and a crosslinking agent; and contacting a subterranean formation with the treatment fluid. The treatment fluid of the present invention may be used for any treatment or subterranean operation known to one of ordinary skill in the art.

In an embodiment, the treatment fluid of the present invention is a fracturing fluid. Thus, the present invention provides for a method of fracturing a subterranean formation penetrated by a well bore and having a temperature above about 200° F., comprising the steps of (a) preparing a treatment fluid comprising a gelling agent, a buffer composition, and an aqueous base fluid, thereby forming a gelled aqueous fluid; and a crosslinking agent, capable of causing crosslinking of the gelling agent at a pH of 10 or less; and (b) introducing the treatment fluid into a subterranean formation at a rate and pressure whereby fractures are formed in the subterranean formation.

Another method of fracturing subterranean formations with a temperature of more than about 200° F. comprises the following steps: (a) preparing a treatment fluid comprising gelling agent; a buffer composition; an aqueous base fluid; and a crosslinking agent; and (b) introducing said fracturing fluid into a subterranean formation at a rate and pressure whereby fractures are formed in the subterranean formation. The fracturing fluid of the present invention is particularly useful in combination fracturing/gravel packing operations.

To facilitate a better understanding of the present invention, the following examples of certain aspects of some embodiments are given. In no way should the following examples be read to limit, or define, the scope of the invention.

EXAMPLE 1

Sample 1 was prepared without the buffer composition of the present invention for use as a comparison. Sample 1 was prepared by adding seawater in an amount of about 500 ml to a blender jar. With moderate agitation, 500 ml of an 80 pound per 1000 gallons of treatment fluid (i.e., "pounds per thousand" or "ppt") HPG gel concentrate with a pH of about 10.7 to about 10.75 was added to produce a 40 ppt hydroxypropylguar gel (the "HPG gel"). A gel stabilizer, 10 ppt of sodium thiosulfate, was added to the blender jar. After 2 minutes of agitation, the pH of the HPG gel was about 8.72. Since the HPG in the 80 ppt concentrate was fully hydrated, additional time for gel hydration was not required. With good agitation, the equivalent of 0.3 gallons per thousand gallons of a zirconate crosslinking agent solution (9.4% to 10.1% zirconium by weight in the crosslinker composition) was added to the HPG gel and allowed to mix for a time of about 30 seconds. The resulting pH of the fluid was about 8.78.

A sample of the resulting crosslinked gel (the "fluid sample") was transferred immediately to an R1 rotor cup of a FANN™ Model 50C viscometer. The rotor cup containing the fluid sample was attached to the viscometer equipped with a C5X bob. The fluid sample was pressurized to about 400 psi throughout the test and immersed in a preheated bath in the viscometer. A series of measurements was performed to determine the viscosity of the fluid at the following conditions, which were intended to model a fluid sample traveling through a well bore and into a formation: the rotor cup was set in motion at 150 revolutions per minute ("rpm") to produce a shear rate of about 127 $sec^{-1}$ in a bath with the temperature of about 75° F.; the rotor cup was stopped with the bath still at a temperature of about 75° F. for 5 minutes to allow the fluid to rest; the rotor cup was then set in motion at 450 rpm for 50 minutes to produce a shear rate of about 381 $sec^{-1}$ in a bath with a temperature that was ramped up from about 75° F. to about 250° F. over about 15 minutes; finally, the rotor cup was then rotated at 47 rpm to produce a shear rate of about 40 $sec^{-1}$ in a bath with a temperature of about 250° F. for 120 minutes. The shear stress at each shear rate was recorded. Power-law indices, n' and K', were calculated from the shear stress versus shear rate values. These indices are defined in the American Petroleum Institute's (API) publication RP39, 3rd Edition, Section 6. The results of these calculations and the apparent viscosity of Sample 1 at each shear rate are shown in FIG. 1.

Generally, fluids with a viscosity greater than 200 centipoises at 40 $sec^{-1}$ are thought to be adequate for fracturing operations. The stability of a fracturing fluid is defined in terms of its ability to maintain an adequate viscosity for an extended period of time at a given temperature. Referring to FIG. 1, the data show that the seawater fracturing fluid formulated by crosslinking a 40 ppt HPG solution without a buffer composition of the present invention has a viscosity of about 145 centipoises at 40 $sec^{-1}$ after 2 hours at a temperature of about 250° F. As this fluid is below 200 centipoises at 40 $sec^{-1}$, the fluid would be inadequate for fracturing operations.

EXAMPLE 2

Figure 2:
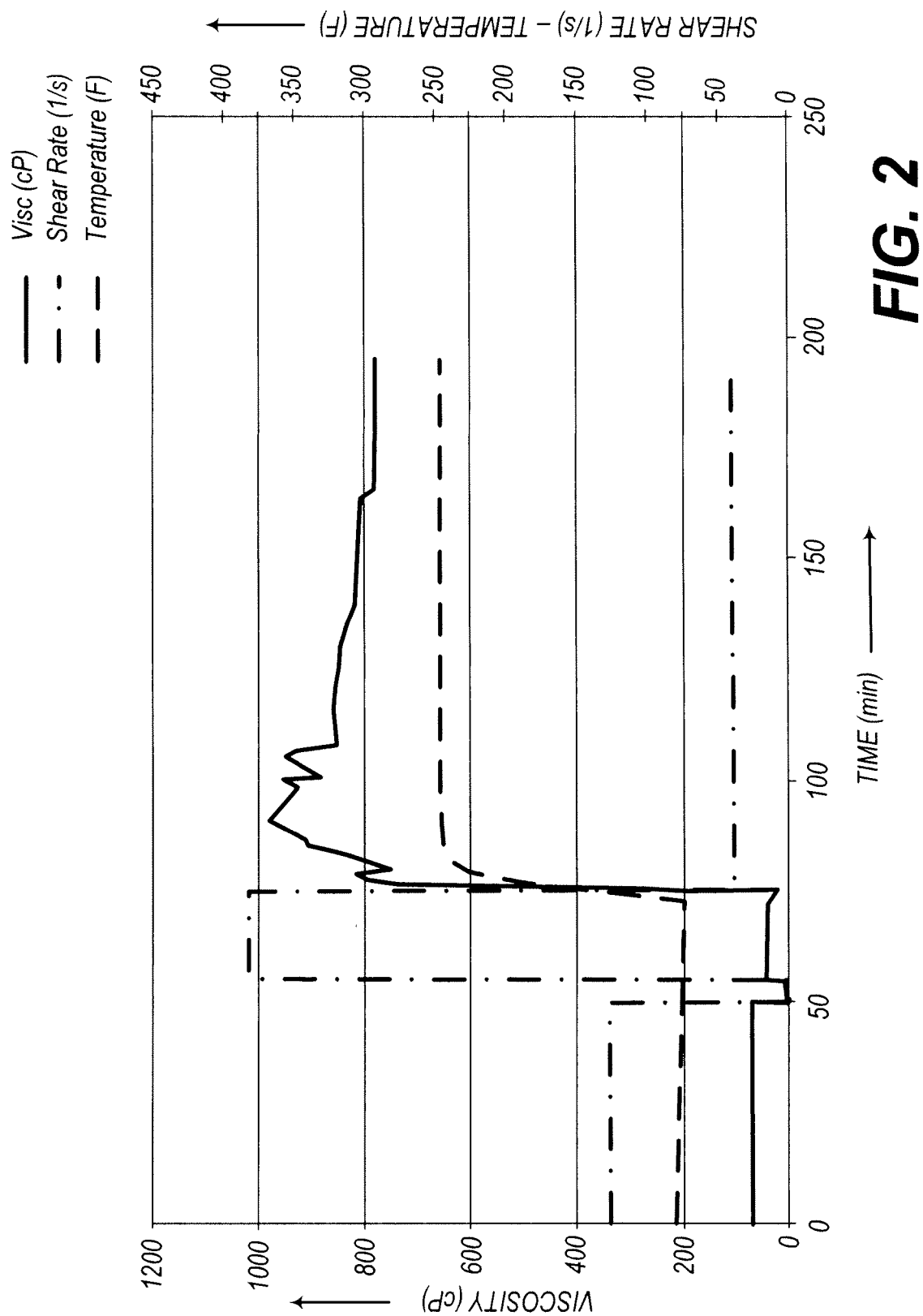
FIG. 2 illustrates a viscosity profile of a fluid according to an embodiment of the present invention.

The experimental procedure described in Example 1 was used to formulate and evaluate comparative samples of seawater-based fracturing fluids prepared with the buffer compositions of the present invention. An identical test procedure and apparatus were used to provide a comparison to the performance of Sample 1. The comparative samples were prepared using the same methods and amounts of HPG, seawater, and gel stabilizer as in Sample 1. However, instead Sample 2 comprised a buffer composition comprising sodium bicarbonate at an amount equivalent to 12.5 ppt was added to the mixture of seawater and base-gel concentrate comprising potassium carbonate at an amount equivalent to 3 gpt. FIG. 2 demonstrates the viscosities of Sample 2 as determined at the various shear rates, including the 40 $sec^{-1}$ shear rate over a 2-hour period at a temperature of about 250° F. Referring to FIG. 2, the data show that the seawater fracturing fluid formulated by crosslinking a 40 ppt HPG solution with a buffer composition of the present invention has a viscosity of about 779 centipoises at 40 $sec^{-1}$ after 2 hours at a temperature of about 250° F. As this fluid is well above 200 centipoises at 40 $sec^{-1}$, the fluid would be adequate for fracturing operations. These results also indicate that the addition of the buffer composition increases the shear recovery of the fluid without the buffer composition by about 537%.

EXAMPLE 3

The experimental procedure described in Example 1 was used to formulate and evaluate another comparative sample of seawater-based fracturing fluids prepared with the buffer compositions of the present invention. Sample 3 was prepared using the same method and relative amounts of HPG and seawater as in Sample 1. Sample 3 contained an amount of gel stabilizer equivalent to 3 gpt and had both a zirconium ion crosslinker at an amount equivalent to about 0.35 gpt and a titanium ion crosslinker equivalent to 0.36 gpt Sample 3 also comprised a buffer composition comprising sodium bicarbonate at an amount equivalent to 15 ppt added to the mixture of seawater and base gel comprising potassium carbonate at an amount equivalent to 3 gpt. The test procedure was modified as follows: the rotor cup was set in motion at about 180 revolutions per minute ("rpm") to produce a shear rate of about 152 $sec^{-1}$ in a bath with the temperature of about 75° F. for 60 minutes; the rotor cup was stopped with the bath still at a temperature of about 75° F. for 7 minutes to allow the fluid to rest; the rotor cup was then set in motion at 600 rpm for about 18 minutes to produce a shear rate of about 508 $sec^{-1}$ in a bath with a temperature that was ramped from about 75° F. to about 250° F. over about 30 minutes; the rotor cup rotation was increased to 1000 rpm for about 1 minute to produce a shear rate of about 847 $sec^{-1}$ in a bath with a temperature was about 250° F.; finally, the rotor cup was then rotated at 47 rpm to produce a shear rate of about 40 $sec^{-1}$ in a bath with a temperature of about 250° F. for 26 minutes.

Figure 3:
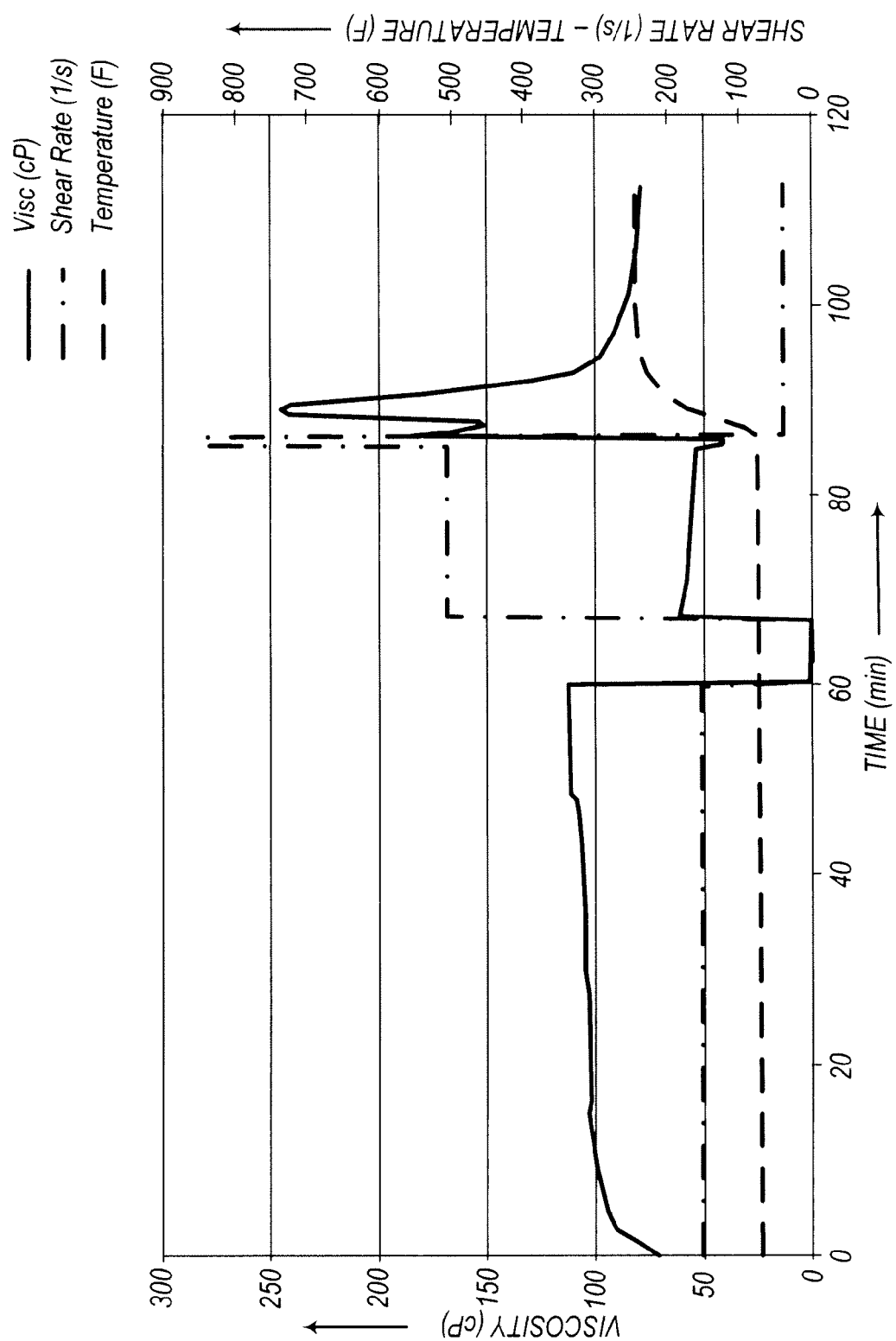
FIG. 3 illustrates a viscosity of another fluid subjected to varying degrees of shear rate.

FIG. 3 demonstrates the viscosities of Sample 3 as determined at the various shear rates, including the 40 $sec^{-1}$ shear rate at a temperature of about 250° F. Referring to FIG. 3, the data show that the seawater fracturing fluid formulated by crosslinking a 40 ppt HPG solution using both a zirconium crosslinker and a titanium crosslinker has a viscosity of about 80 centipoises at 40 sec after 26 minutes at a temperature of about 250° F. As this fluid is below 200 centipoises at 40 $sec^{-1}$, the fluid would be inadequate for fracturing operations. The results indicate that some crosslinker compositions may not be affected by the buffer compositions of the present invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid comprising:
  a gelling agent,
  seawater,
  a buffer composition comprising a plurality of salts selected from the group consisting of sodium carbonate, potassium carbonate, sodium bicarbonate, potassium bicarbonate, and combinations thereof, and
  a crosslinking agent
  wherein the shear recovery of the treatment fluid is at least 100% greater than the shear recovery of a fluid lacking the buffer composition after a shear event of at least 450s$^{-1}$; and
contacting a subterranean formation with the treatment fluid wherein the subterranean formation has a temperature greater than about 200° F.

2. The method of claim 1 wherein the treatment fluid further comprises a pH adjusting agent.

3. The method of claim 1 wherein the gelling agent comprises at least one compound selected from the group consisting of: guar, hydroxypropylguar, carboxymethylhydroxypropylguar, carboxymethylguar, carboxymethylcellulose, carboxymethylhydroxy-ethylcellulose, and any combination thereof.

4. The method of claim 1 wherein the gelling agent is present in the treatment fluid in an amount in the range of about 10 to about 100 pounds per 1,000 gallons of the aqueous base fluid.

5. The method of claim 1 wherein the crosslinking agent comprises at least one compound selected from the group consisting of: a borate ion, a zirconium ion, and any combination thereof.

6. The method of claim 1 wherein the crosslinking agent accelerates the crosslinking of the treatment fluid.

7. The method of claim 1 wherein the crosslinking agent is encapsulated.

8. The method of claim 1 wherein the treatment fluid has a high shear recovery greater than 100%.

9. The method of claim 1 wherein the buffer composition is present in the treatment fluid in an amount in the range of about 1 to about 50 pounds per 1,000 gallons of the treatment fluid.

10. A method comprising:
providing a treatment fluid comprising a gelling agent, seawater, a buffer composition, and a crosslinking agent, wherein the shear recovery of the treatment fluid is at least 100% greater than the shear recovery of a fluid lacking the buffer composition after a shear event of at least 450s$^{-1}$, and
  wherein the buffer composition comprises a plurality of salts selected from the group consisting of sodium carbonate, potassium carbonate, sodium bicarbonate, potassium bicarbonate, and combinations thereof;
  wherein the treatment fluid has a pH of less than 9.5;
introducing the treatment fluid into a subterranean formation at a rate and pressure whereby a fracture is formed in the subterranean formation, wherein the subterranean formation has a temperature greater than about 200° F.;
allowing the treatment fluid to break; and
recovering at least a portion of the treatment fluid.

11. The method of claim 10 wherein the treatment fluid further comprises a pH adjusting agent, and wherein the pH adjusting agent is present in the treatment fluid in an amount in the range of about 0.5% to about 10% by weight of the aqueous base fluid.

12. The method of claim 10 further comprising contacting the treatment fluid with a breaker.

13. The method of claim 12 wherein the breaker comprises at least one compound selected from the group consisting of: an oxidizing agent, an enzyme, an acid, and any combination thereof.

14. A composition comprising:
a gelling agent;
seawater;
a buffer composition comprising sodium bicarbonate and potassium bicarbonate; and
a crosslinking agent;
  wherein the shear recovery of the composition is at least 100% greater than the shear recovery of a fluid lacking the buffer composition after a shear event of at least 450s$^{-1}$.

15. The composition of claim 14 wherein the composition further comprises at least one aqueous fluid selected from the group consisting of: fresh water, saltwater, brine, weighted brine, and any combination thereof.

16. The composition of claim 14 wherein the treatment fluid further comprises a pH adjusting agent, and wherein the pH adjusting agent comprises at least one compound selected from the group consisting of: formic acid, fumaric acid, acetic acid, acetic anhydride, hydrochloric acid, sodium hydroxide, potassium hydroxide, lithium hydroxide, a carbonate, and any combination thereof.

17. The composition of claim 14 wherein the crosslinking agent comprises at least one compound selected from the group consisting of: a borate ion, a zirconium ion, and any combination thereof.

18. The composition of claim 14 wherein the crosslinking agent is present in the treatment fluid in an amount in the range of about 1 part per million to about 1,000 parts per million by weight of the treatment fluid.

* * * * *